(12) United States Patent
Yoo et al.

(10) Patent No.: US 10,126,591 B2
(45) Date of Patent: Nov. 13, 2018

(54) DISPLAY APPARATUS

(71) Applicant: SAMSUNG ELECTRONICS CO., LTD., Suwon-si (KR)

(72) Inventors: Jun-Mo Yoo, Yongin-si (KR); Jean Hur, Seongnam-si (KR)

(73) Assignee: SAMSUNG ELECTONICS CO., LTD., Suwon-si (KR)

( * ) Notice: Subject to any disclaimer, the term of this patent is extended or adjusted under 35 U.S.C. 154(b) by 0 days.

(21) Appl. No.: 15/701,592

(22) Filed: Sep. 12, 2017

(65) Prior Publication Data

US 2018/0136516 A1  May 17, 2018

(30) Foreign Application Priority Data

Nov. 15, 2016 (KR) .................. 10-2016-0151975

(51) Int. Cl.
*G02F 1/1333* (2006.01)
*G02F 1/1335* (2006.01)
*G02F 1/1345* (2006.01)

(52) U.S. Cl.
CPC .. *G02F 1/133528* (2013.01); *G02F 1/133308* (2013.01); *G02F 1/133512* (2013.01);
(Continued)

(58) Field of Classification Search
CPC ......... G02F 1/133528; G02F 1/133308; G02F 1/33605; G02F 1/133512; G02F 1/133606; G02F 1/133502; G02F 1/13452; G02F 1/133608; G02F 2001/13332; G02F 2001/133388; G02F 2001/133322; G02F 2001/133311; G02F 2001/133317; G02F 2001/133314; G02F 2001/133325; G02F 2001/133328; G02F 2001/133331
See application file for complete search history.

(56) References Cited

U.S. PATENT DOCUMENTS 6,307,606 B1 * 10/2001 Takii ................. G02F 1/133514
349/106
6,348,958 B1 * 2/2002 Matsuoka ......... G02F 1/133514
349/106

(Continued)

FOREIGN PATENT DOCUMENTS

| CN | 201340699 Y | 11/2009 |
|---|---|---|
| EP | 2 381 298 A2 | 10/2011 |
| KR | 10-2015-0112620 A | 10/2015 |

OTHER PUBLICATIONS

Communication dated Mar. 2, 2018, issued by the European Patent Office in counterpart European application No. 17192760.1.

*Primary Examiner* — Joseph L Williams
*Assistant Examiner* — Jose M Diaz
(74) *Attorney, Agent, or Firm* — Sughrue Mion, PLLC

(57) ABSTRACT

Provided is a display apparatus without a front chassis or a bezel. A front frame is provided on at least one side of a display panel to hide a chip-on-film and a printed circuit board coupled to the display panel that would be otherwise exposed to the outside. A front surface of the front frame may have a color and light reflectivity corresponding to those of a non-display area of the display panel. Thus, the display panel and the front frame may appear to be integrally formed. Accordingly, a bezel-less display apparatus, in which no bezel is formed around the display panel, may be achieved.

20 Claims, 11 Drawing Sheets

(52) U.S. Cl.
CPC .. *G02F 1/133605* (2013.01); *G02F 1/133606* (2013.01); *G02F 1/13452* (2013.01); *G02F 1/133502* (2013.01); *G02F 2001/13332* (2013.01); *G02F 2001/133388* (2013.01)

(56) References Cited

U.S. PATENT DOCUMENTS

| | | |
|---|---|---|
| 2013/0286624 A1 | 10/2013 | Lee et al. |
| 2015/0241606 A1 | 8/2015 | Kim |
| 2016/0054624 A1* | 2/2016 | Cho ................ G02F 1/133605 349/58 |
| 2016/0363720 A1* | 12/2016 | Li .................... G02F 1/133608 |
| 2017/0139090 A1* | 5/2017 | Hino ..................... G02B 5/201 |

* cited by examiner

DISPLAY APPARATUS

CROSS-REFERENCE TO RELATED APPLICATION

This application claims priority from Korean Patent Application No. 10-2016-0151975, filed on Nov. 15, 2016 in the Korean Intellectual Property Office, the disclosure of which is incorporated herein in its entirety by reference.

BACKGROUND

1. Field

Apparatuses and methods consistent with example embodiments relate to a display apparatus having a streamlined exterior surface without a bezel.

2. Description of the Related Art

A display apparatus presents multimedia experience to the viewer by displaying images and videos. Examples of a display apparatus include a monitor and a television. Inside the display apparatus, a self-emitting display panel, such as an organic light-emitting diode (OLED), or a light-receiving display panel, such as a liquid crystal display (LCD) panel, may be used to display images.

A display apparatus with a light-receiving display panel may include a display panel (e.g., a liquid crystal panel) that displays an image, and a backlight unit that supplies light to the display panel. The backlight unit may include a light source unit and a plurality of optical sheets that receive light from the light source unit and guide the light to the display panel.

Conventionally, the display panel, the backlight unit, etc. of the display apparatus are provided in a space formed between a back chassis and a front chassis located in front of the back chassis and coupled to the back chassis. The front chassis is a structure that holds the components of the display apparatus together and dictates a width of a bezel.

The display apparatus may appear crude and thus aesthetically less pleasing when the bezel is wide. Furthermore, the bezel is a factor that determines a display area of the display panel. Therefore, it is desirable to decrease a width of the bezel as much as possible.

SUMMARY

One or more example embodiments provide a bezel-less display apparatus in which no bezel is arranged on four side surfaces of a display panel.

According to an aspect of an example embodiment, a display apparatus may include a display panel and a front frame configured to cover a side of a first front surface of the display panel. The display panel may include a display area configured to display an image in a forward direction, and a non-display area provided at edges of the display area. The front frame may include a frame body, and a plurality of layers arranged on a second front surface of the frame body, the front frame having a first color corresponding to a second color of the non-display area.

The non-display area may include a black matrix region. The plurality of layers may include a first layer having a third color corresponding to a fourth color of the black matrix region.

The plurality of layers may further include a second layer disposed in front of the first layer and configured to decrease first light reflectivity of a third front surface of the front frame such that the first light reflectivity of the front frame corresponds to second light reflectivity of the non-display area.

The plurality of layers may further include a third layer disposed between the first layer and the second layer, the third layer including a transparent material.

The plurality of layers may further include a fourth layer disposed between the second layer and the third layer, the fourth layer including an iodine (I) material.

The first layer may include an iodine (I) material.

The display panel may further include a polarizer, a first substrate disposed behind the polarizer, and a second substrate disposed behind the first substrate. A third front surface of the front frame may be level with a fourth front surface of the polarizer.

The front frame may be in contact with the first substrate.

The display apparatus may further include a printed circuit board configured to transmit an electrical signal to the display panel, and a chip-on-film configured to couple the printed circuit board to the display panel. The chip-on-film may be disposed behind the front frame.

The display apparatus may further include a middle mold configured to support the display panel, and a chassis configured to be coupled to a rear side of the middle mold. The chip-on-film may be bent behind the front frame toward a rear surface of the chassis.

The display apparatus may further include a cover configured to cover a first side surface of the display panel and a second side surface of the front frame.

A third front surface of the cover may be level with a fourth front surface of the front frame.

According to an aspect of an example embodiment, a display apparatus may include a display panel divided into a display area configured to display an image in a forward direction and a non-display area provided at edges of the display area, and a front frame configured to cover at least portions of a first front surface of the display panel. The display panel may include a polarizer, a first substrate disposed behind the polarizer, and a second substrate disposed behind the first substrate. The front frame may have a first color corresponding to a second color of the non-display area. A second front surface of the front frame may be disposed on a level plane as a third front surface of the polarizer.

The non-display area may include a black matrix region. The front frame may include a first layer having a third color corresponding to a fourth color of the black matrix region.

The front frame may further include a second layer disposed in front of the first layer, the second layer having a fifth color corresponding to a sixth color of the first substrate; and a third layer disposed in front of the second layer, the third layer having a first material corresponding to a second material of the polarizer. The front frame may have first light reflectivity corresponding to second light reflectivity of the non-display area.

The front frame may further include a fourth layer disposed between the second layer and the third layer, the fourth layer having a seventh color corresponding to an eighth color of the polarizer.

The front frame may be in contact with the first substrate.

The display apparatus may further include a printed circuit board configured to transmit an electrical signal to the display panel, and a chip-on-film configured to couple the printed circuit board to the display panel. The chip-on-film may be disposed behind the front frame to be hidden from a view from an outside of the display apparatus.

According to an aspect of an example embodiment, a display apparatus may include a display panel divided into a display area configured to display an image in a forward direction and a non-display area provided at edges of the display area, a printed circuit board, a chip-on-film connecting the printed circuit board to the display panel, a front frame configured to cover the chip-on-film and disposed at a side of a front surface of the display panel, and a cover configured to cover a first side surface of the display panel and a second side surface of the front frame, the cover being arranged not to cover the non-display area.

The front frame may have a first color and first light reflectivity respectively corresponding to a second color and second light reflectivity of the non-display area.

Additional aspects of the disclosure will be set forth in part in the description which follows and, in part, will be obvious from the description, or may be learned by practice of the disclosure.

BRIEF DESCRIPTION OF THE DRAWINGS

The above and/or other aspects of the disclosure will become apparent and more readily appreciated from the following description of example embodiments, taken in conjunction with the accompanying drawings of which.

DETAILED DESCRIPTION

Figure 1:
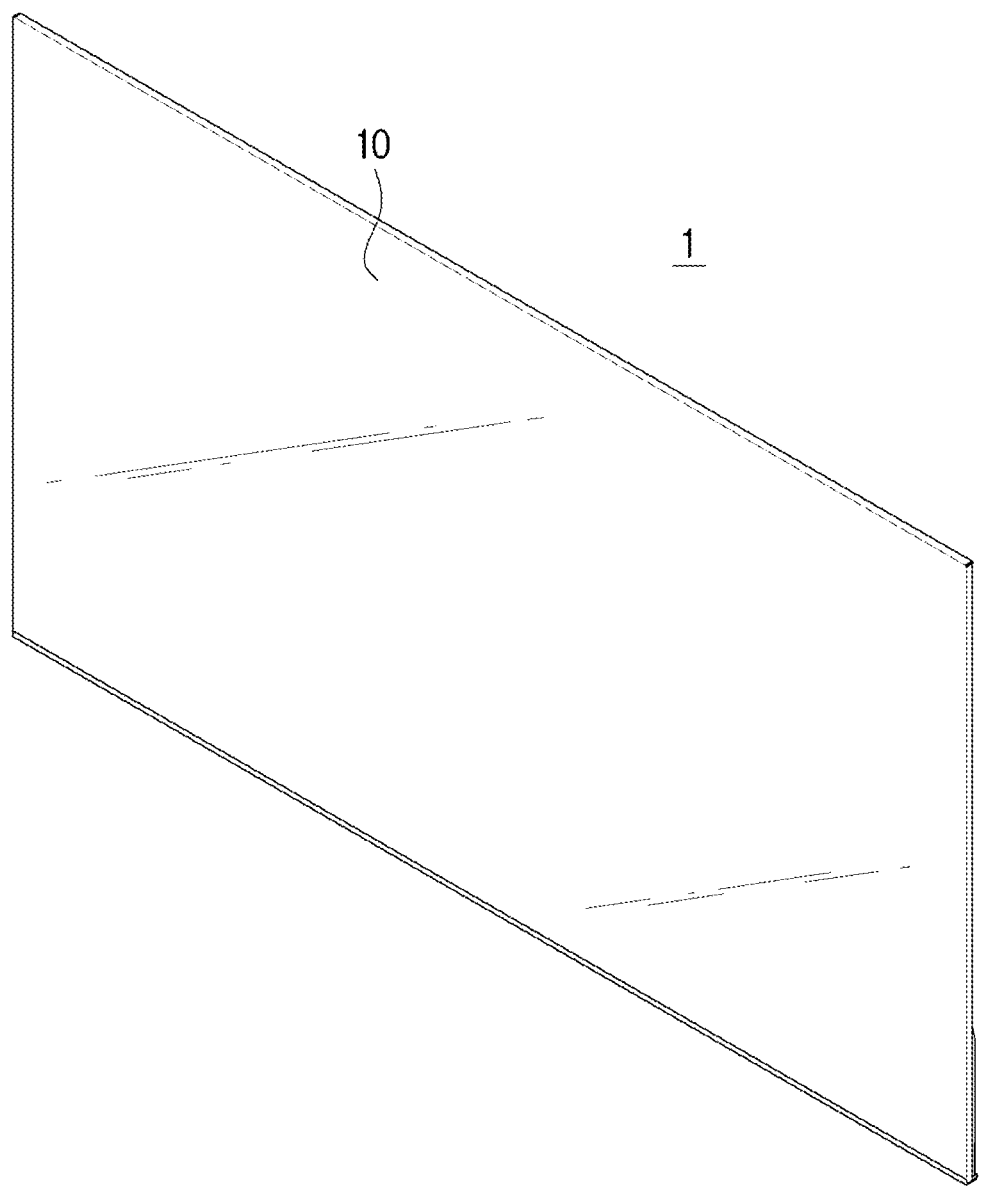
FIG. 1 is a perspective view of a display apparatus in accordance with an example embodiment.
Figure 2:
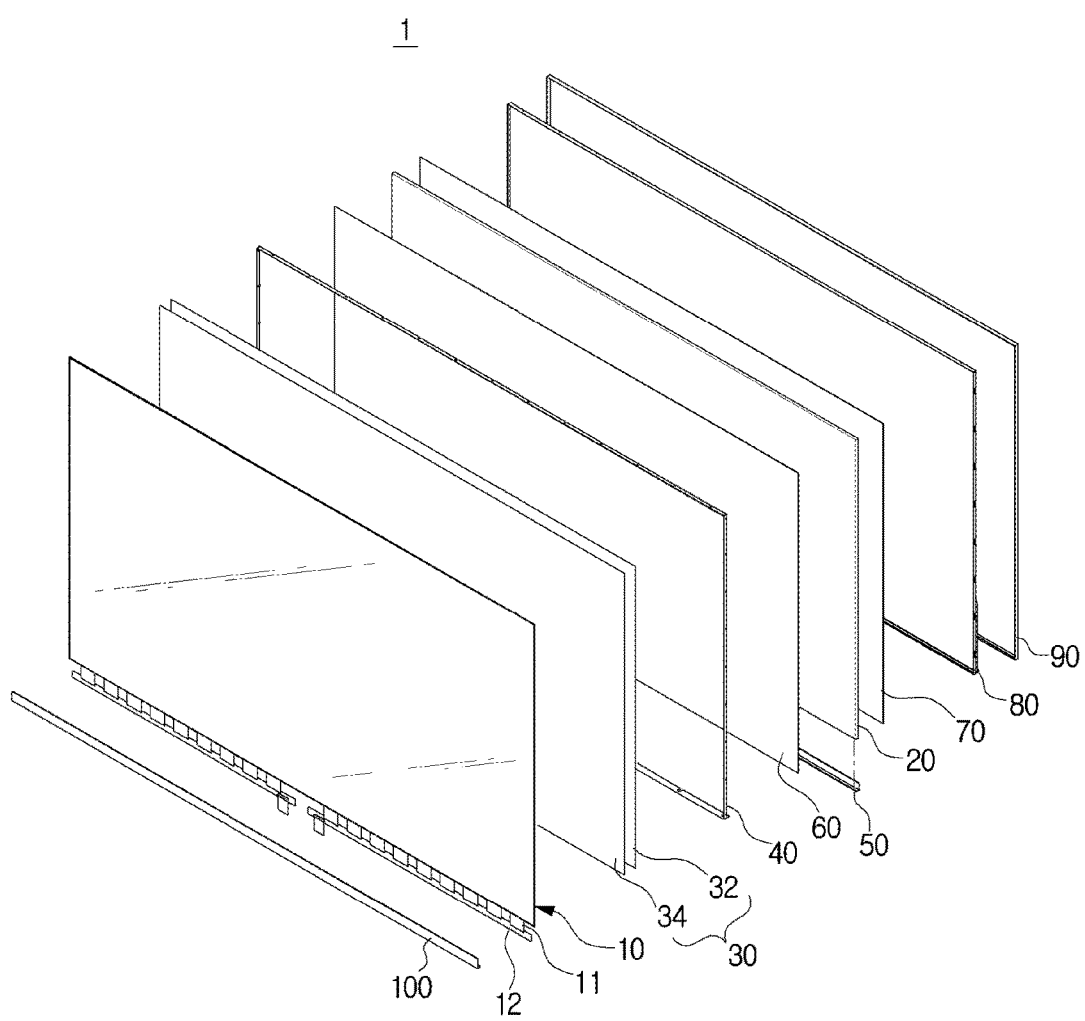
FIG. 2 is an exploded perspective view of a display apparatus in accordance with an example embodiment.

Reference will now be made in detail to exemplary embodiments, with reference to the accompanying drawings. In the drawings, parts irrelevant to the description are omitted to clearly describe the exemplary embodiments.

The same reference numbers or signs assigned in the drawings of the present disclosure represent components or elements having substantially the same functions.

The terminology used herein is for the purpose of describing particular example embodiments only and is not intended to be limiting and/or defining of the present disclosure. As used herein, the singular forms "a," "an," and "the" are intended to include the plural forms as well, unless the context clearly indicates otherwise. It should be further understood that the terms "comprise" and/or "comprising," when used in this specification, specify the presence of stated features, integers, steps, operations, elements, components, and/or a combination thereof but do not preclude the presence or addition of one or more other features, integers, steps, operations, elements, components, and/or a combination thereof.

It should be understood that, although the terms "first," "second," etc., may be used herein to describe various components, the components are not limited by these terms. These terms are only used to distinguish one component from another component. For example, a first component discussed below could be termed a second component without departing from the scope of the present disclosure. Similarly, a second component discussed below could be termed a first component. Moreover, the designation of "first," "second," etc. does not necessarily imply that the designated objects are distinct from one another, although they can be distinct from each other. For example, a "first surface" and a "second surface" may be different surfaces, same surfaces, partially overlapping surfaces, etc. The term "and/or" includes any and all combinations of one or more of the associated listed items. The word "exemplary" is used herein to mean "serving as an example or illustration." Any aspect or design described herein as "exemplary" is not necessarily to be construed as preferred or advantageous over other aspects or designs. Moreover, claim language reciting "one of" or "at least one of" a set (e.g., "at least one of A, B, and C" or "at least one of A, B, or C") indicates that one member of the set or multiple members of the set satisfy the claim.

Hereinafter, example embodiments of the present disclosure will be described in detail with reference to the accompanying drawings.

The present disclosure will be described with respect to a display apparatus 1 of FIG. 1, which is a flat display apparatus, as an example but is applicable to a curved display apparatus or a bendable or flexible display apparatus which may be switched between a curved state and a flat-panel state.

Furthermore, the present disclosure is applicable to the display apparatus 1 regardless of a screen size thereof. As an example, the present disclosure is applicable to either a product (such as a smart television or a monitor) which may be installed on a table, a wall or ceiling of a room, or a portable product (such as a tablet computer, a notebook computer, a smart phone, or an e-book reader).

As used herein, the terms "front" and "front surface" refer to a front surface of the display panel 10 on which an image is displayed with respect to the display apparatus 1 of FIG. 1 (e.g., the display surface that typically faces a viewer). Thus, the "front" direction faces toward the viewer from the display apparatus 1. A "rear surface" refers to a surface that is facing toward the rear direction of the display apparatus 1, which is the opposite direction of the "front" direction. The terms "upper side" and "lower side" should be understood as meaning an upper side and a lower side with respect to a vertical axis of the display apparatus 1 of FIG. 1 and the terms "horizontal direction" and "lateral direction" should be understood as meaning a horizontal direction of the display apparatus 1 with respect to the front surface of the display panel 10 (e.g., left-hand side and right-hand side of the display panel 10 from the perspective of its viewer). A "side surface" may refer to any surface that is not the front or rear surface, such as a top, bottom, left, or right surface from the perspective of a viewer located directly in front of the display apparatus 1.

The display apparatus 1 illustrated in FIGS. 1 to 4 may include the display panel 10 configured to display an image, a light guide plate 20 located behind the display panel 10 and configured to diffuse light from a light source and transmit the light to the display panel 10 in front of the light guide plate 20, and an optical sheet 30 provided between the display panel 10 and the light guide plate 20 to improve optical features of the light diffusing through the light guide plate 20.

The display apparatus 1 may include a light source module 50 having a plurality of light sources generating light. The light source module 50 may be provided on at least one side surface among four side surfaces (e.g., top, bottom, left, and right) of the light guide plate 20 to emit light toward a side surface of the light guide plate 20 such that the light may be emitted toward the display apparatus 1.

The display apparatus 1 may further include a diffusion plate 60 provided between the light guide plate 20 and the display panel 10 to diffuse light from the light guide plate 20, and a reflecting plate 70 provided behind the light guide plate 20 to reflect the light from the light guide plate 20 in a front direction (e.g., towards the viewer).

In accordance with an example embodiment of the present disclosure, the light source module 50 is provided on a lower side surface of the light guide plate 20 and emits light upward from the lower side (i.e., bottom) surface of the light guide plate 20. However, embodiments are not limited thereto, and the light source module 50 may be provided on an upper side of the light guide plate 20, a pair of light source modules 50 may be provided on the upper side and a lower side of the light guide plate 20, the light source module 50 may be provided on a left or right side surface of the light guide plate 20, or the pair of light source modules 50 may be provided on the left and right side surfaces of the light guide plate 20.

To support the above-described components, the display apparatus 1 may include a middle mold 40 configured to support the display panel 10 and the optical sheet 30, and a chassis 80 coupled to a rear side of the middle mold 40 and configured to accommodate and support the light guide plate 20 and the light source module 50.

The display apparatus 1 may further include a cover member 90 extending from the rear of the chassis 80 to cover side surfaces of the middle mold 40 and the display panel 10.

The display panel 10 may be a liquid crystal panel in which a first substrate 13 and a second substrate 14 including electrodes and formed of glass are provided, and liquid crystals may be filled between the first substrate 13 and the second substrate 14 facing each other. A printed circuit board (PCB) 12 which provides information to the display panel 10 may be located at a lower side of the display panel 10. Furthermore, a chip-on-film (hereinafter referred to as "CoF") 11 electrically connecting the PCB 12 and the display panel 10 may be located at the lower side of the display panel 10.

The CoF 11 extends from a lower side part of the display panel 10 and is coupled to the PCB 12. The CoF 11 may be bent at the lower side of the display panel 10 and extend to the rear of the back chassis 80. Thus, the PCB 12 may be located behind the back chassis 80, as will be described in detail below.

The optical sheet 30 may include a diffusion sheet 32 which re-diffuses light transmitted via the light guide plate 20, a prism sheet 34 which concentrates the diffused light in a direction perpendicular to the display surface of the display panel 10, a protective sheet protecting the prism sheet 34, and the like.

The plurality of light sources of the light source module 50 may include light-emitting diodes (LEDs) which are point light sources formed in thin films by a thin screen mounted on a bar type PCB.

In a display apparatus in accordance with a related art, a front chassis formed in a rectangular framework covering side surfaces of the display apparatus and coupled to a display panel in front of a display panel and a bezel covering outer sides of the front chassis and forming an exterior of the display apparatus are provided to prevent a CoF and a PCB of the display panel from being exposed to the outside. A bezel is a frame that surrounds a display panel and is typically made out of a material (e.g., plastic) that is different from the display panel with regard to color, light reflectivity, etc. A shape or texture of a typical bezel is also different from the display panel because a bezel may have a slanted, rounded, or raised profile or a rough finish compared to the flat and smooth surface of the display panel. Thus, conventionally a bezel is prominently visible to the viewer and may render the overall appearance of the display apparatus less aesthetically pleasing due to the lack of uniformity in material and shape.

In detail, as described above, the CoF is coupled to a side of the display panel and extends to a rear side of the display panel. To protect the CoF and prevent the CoF from being exposed to the outside, the front chassis or the bezel includes an extension surface extending from an edge thereof to a side of the display panel to which the CoF and the PCB are coupled.

The extension surface of the front chassis or the bezel covers a portion of the front surface of the display panel from an edge of the display panel. In particular, the extension surface is bent at an edge thereof in front of the display panel and extends to a center of the display panel. Thus, a step is generated between the extension surface and the front surface of the display panel.

Furthermore, the extension surface extends by a certain length to cover the CoF, and thus a width of the front chassis or the bezel increases by the length, thereby negatively affecting the aesthetics of an exterior of the display apparatus in a related art.

Recently, display apparatuses which include a bezel having a minimum width or exteriors which are formed by a front chassis excluding the bezel to improve the aesthetics thereof have been developed. In particular, bezel-less display apparatuses have been developed, in which a minimum number of components are located outside a display panel when viewed by a user in front of the display apparatus.

Although a display apparatus in accordance with a related art features a technique for reducing a width of a bezel or a width of a front chassis, a CoF is exposed to the outside when the width of the bezel or the width of the front chassis is decreased by reducing a length of the above-described extension surface. Accordingly, the length of the extension surface cannot be minimized, and thus a bezel-less display apparatus cannot actually be realized.

In order to achieve a bezel-less display apparatus, the display apparatus 1 in accordance with an example embodiment of the present disclosure includes neither a bezel nor a front chassis, and thus does not include an extension surface.

Thus, the display apparatus 1 in accordance with an example embodiment of the present disclosure includes neither a bezel nor a front chassis, and thus no component may appear to be arranged at an outer side of the display panel 10 when viewed from the front of the display apparatus 1. Accordingly, the display apparatus 1 may actually be a bezel-less display apparatus.

However, since an extension surface is not provided, the CoF 11 may be exposed to the outside as described above. To prevent this problem, the display apparatus 1 according to an aspect of an example embodiment may include a front frame 100 which protects the CoF 11 and the PCB 12 coupled to the CoF 11 and prevents the CoF 11 and the PCB 12 from being exposed to the outside.

The display panel 10 and the front frame 100 will be described in detail below.

Figure 3:
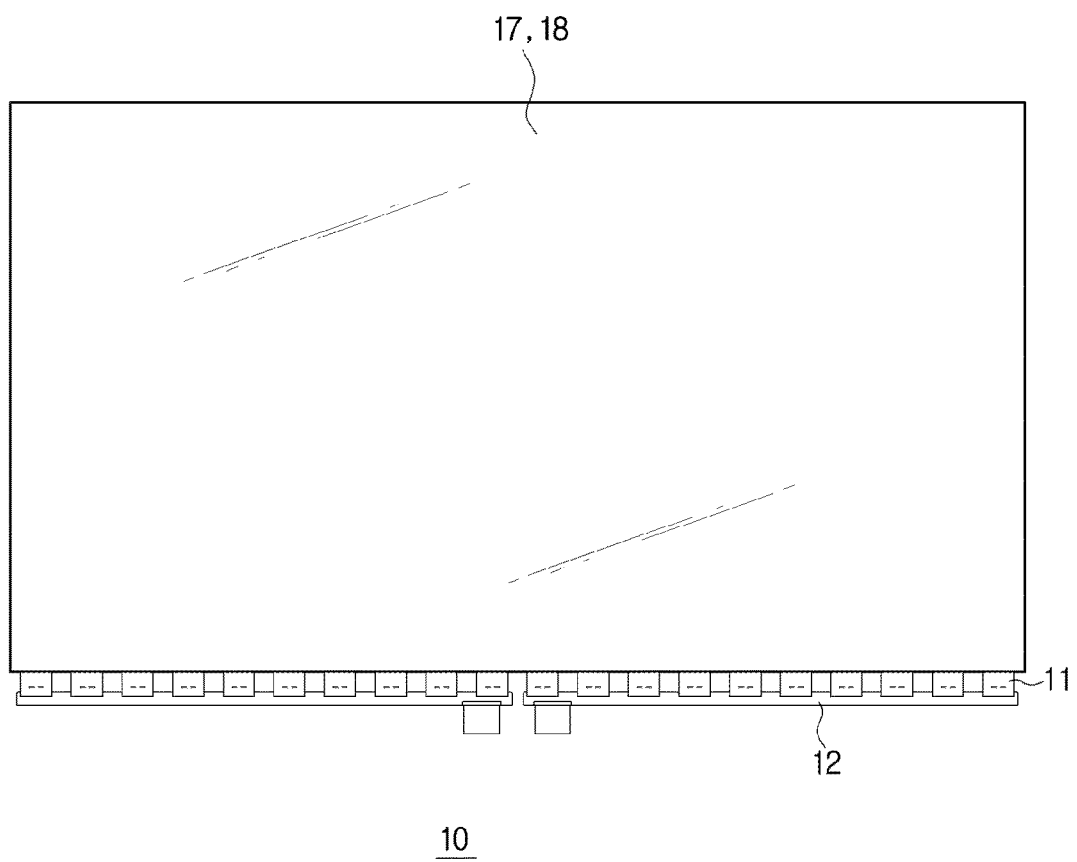
FIG. 3 is a front view of a display panel of a display apparatus in accordance with an example embodiment.
Figure 4:
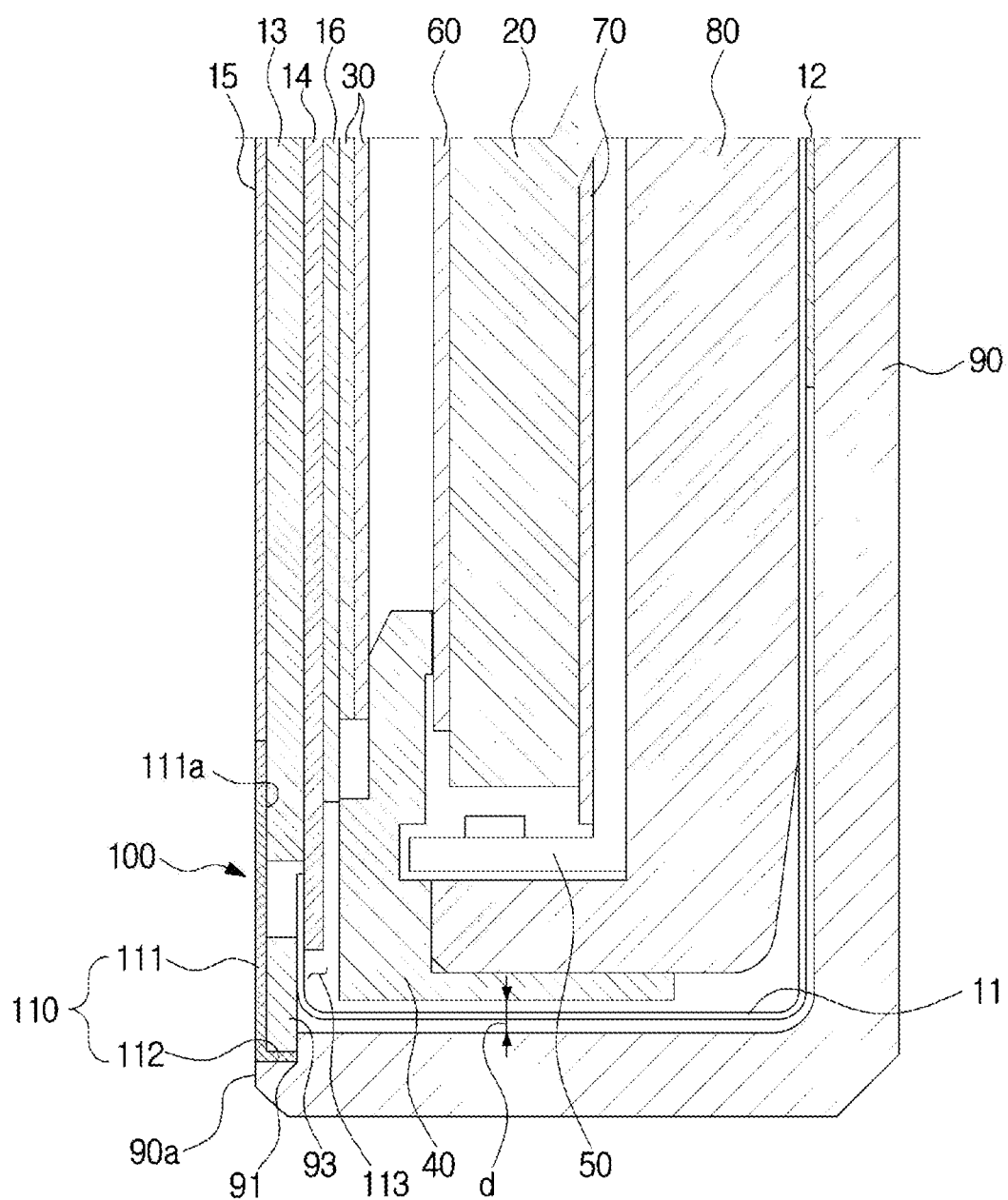
FIG. 4 is a cross-sectional view of a part of a display apparatus in accordance with an example embodiment.
Figure 5:
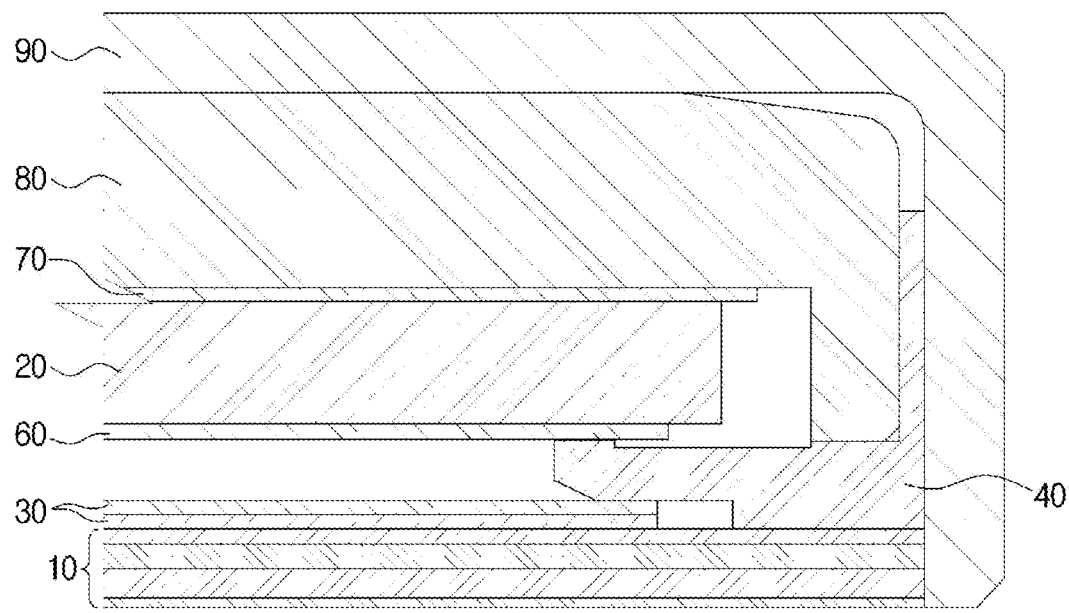
FIG. 5 is a cross-sectional view of another part of a display apparatus in accordance with an example embodiment.

As illustrated in FIGS. 3 to 5, the display panel 10 may include a first polarizer 15 on a front surface of the first substrate 13 and a second polarizer 16 on a rear surface of the second substrate 14, and the PCB 12 may be coupled to the display panel 10 via the CoF 11 to control the display panel 10.

The CoF 11 may include a film PCB, which is in a film form, and a semiconductor chip mounted on the film PCB. Since one end of the CoF 11 is coupled to the lower side of the display panel 10 and the other end thereof is coupled to the PCB 12, the CoF 11 may transmit an image signal from the PCB 12 to the display panel 10.

For the coupling to the CoF 11, a lower end of the second substrate 14 is formed to have a step (e.g., longer in length and extending out) with respect to a lower end of the first substrate 13. Thus, a front surface of the lower end of the second substrate 14 is exposed in the forward direction, and one end of the CoF 11 may be coupled to the exposed front surface of the lower end of the second substrate 14.

According to an aspect of an example embodiment, the first substrate 13 may be formed to have a step (e.g., longer in length and extending out) with respect to the first polarizer 15, and thus a front surface of a lower end of the first substrate 13 is exposed in the forward direction. Thus, at a lower end of the display panel 10, a step is formed between the first polarizer 15 and the first substrate 13 and a step is formed between the first substrate 13 and the second substrate 14. That is, steps (e.g., a cascading structure or indents) are formed at a front surface of a lower end of the display panel 10 due to different sizes of the components of the display panel 10. In other words, the first substrate 13 may have a bigger surface area than the first polarizer 15, and the second substrate 14 may have a still bigger surface area than the first substrate 13, thereby leaving portions (e.g., edges) of the first substrate 13 and the second substrate 14 uncovered by the subsequent layer.

As described above, the display apparatus 1 may not include a front chassis and a bezel, and thus the steps of the display panel 10 and the CoF 11 coupled to the lower end of the second substrate 14 may be exposed to the outside.

To solve these problems, the display apparatus 1 may include the front frame 100 covering a portion (e.g., bottom portion) of the front surface of the display panel 10 and the CoF 11.

That is, as illustrated in FIG. 4, the front frame 100 may be arranged on the lower side of the display panel 10 to cover the steps of the display panel 10 and the CoF 11, which are located at the lower side of the display panel 10, so that the steps of the display panel 10 and the CoF 11 may be hidden from the front of the display apparatus 1.

In detail, the front frame 100 may be provided to cover at least a portion of the front surface of the lower side of the display panel 10. The front frame 100 may extend by at least a length of the second substrate 14 extending downward, and thus cover all of the lower end of the second substrate 14, the CoF 11 bent toward a rear surface of the chassis 80 through the lower end of the second substrate 14, and the PCB 12 coupled to the CoF 11.

The front frame 100 may include a frame body 110 and a plurality of layers 120 provided on a front surface of the frame body 110. The plurality of layers 120 may be arranged on a front surface of the front frame 100 which is exposed to the outside, as will be described in detail below.

The frame body 110 may include a front surface part 111 extending in parallel to the display panel 10, and a side surface part 112 bent at an angle from the front surface part 111 and supported by the cover member 90.

The steps of the lower side the display panel 10 and the CoF 11 may be located in a hidden space 113 provided between a rear side of the front surface part 111 and the side surface part 112. The CoF 11 may be bent from the hidden space 113 and extend to the rear surface of the chassis 80.

The front frame 100 may be arranged on the front surface of the first substrate 13. In detail, a rear surface of the front surface part 111 of the frame body 110 may be in contact with the front surface of the first substrate 13. That is, an adhesive surface 111a may be provided on a portion of the rear surface of the front surface part 111 to be adhered to the front surface of the first substrate 13. Another portion of the rear surface of the front surface part 111 extending from the adhesive surface 111a may extend from the first substrate 13 to the cover member 90 to cover the second substrate 14.

As described above, the step is formed between the first polarizer 15 and the first substrate 13, and the front surface part 111 may be provided on the step between the first polarizer 15 and the first substrate 13.

The front surface of the front frame 100, i.e., an uppermost layer 121 of the plurality of layers 120, may correspond to a location of a front surface of the first polarizer 15. In other words, the front surface of the front frame 100 may be flush or level with the front surface of the first polarizer 15.

That is, thicknesses of the front surface part 111 and the plurality of layers 120 may correspond to that of the first polarizer 15. In other words, the thicknesses of the front surface part 111 and the plurality of layers 120 or a thickness of the front frame 100 may correspond to a depth of the step between the first polarizer 15 and the first substrate 13.

The adhesive surface 111a of the frame body 110 and the first substrate 13 may be coupled to each other via an adhesive or the like while being in contact with each other. Thus, the front frame 100 may be arranged to be in contact with the display panel 10 and coupled to the display panel 10.

A space may be formed between the second substrate 14 and the other portion of the rear surface of the front surface part 111 which is not adhered to the first substrate 13. This space corresponding to the hidden space 113 formed between the rear side of the front surface part 111 and the side surface part 112, may be a space in which the CoF 11 extending from the second substrate 14 may be bent and coupled to the rear side of the display panel 10.

In an existing display apparatus, a bezel is required at an end of a display panel to hide steps and a CoF as described above. In contrast, in the present example embodiment, the lower end of the display apparatus 1 is covered with the front frame 100, and thus a bezel or a front chassis is not required.

Furthermore, the front frame 100 is on the same plane as (e.g., flush or level with) the front surface of the display panel 10, and may thus appear to be integrally formed with the display panel 10, thereby realizing the display apparatus 1 as a bezel-less display apparatus.

As described above, the display apparatus 1 may not include a front chassis or a bezel, and thus the cover member 90 may cover the side surface of the display apparatus 1 while supporting the side surface of the display apparatus 1.

Thus, the cover member 90 may extend from the rear side of the chassis 80 to the side surface of the display panel 10 to cover the side surface of the display panel 10.

As illustrated in FIG. 4, the cover member 90 extending to the lower side of the display panel 10 may include a support part 91 supporting the front frame 100. In detail, the frame body 110 may include the side surface part 112 formed as a side of the frame body 110 close to the cover member 90 to be bent, and the side surface part 112 may be supported by the support part 91.

The side surface part 112 may be in contact with the support part 91 without separation (e.g., with little to no gap in between) to be supported thereby. The support part 91 may be an indent formed along an inner edge of the cover member 90. Thus, the CoF 11 may not be exposed on the front surface of the display apparatus 1. Unlike the adhesive surface 111a, the side surface part 112 need not be adhered to the support part 91 so that an external force may not be transferred to the display panel 10 when the external force is applied to the display apparatus 1.

A support member 93 may be provided in a space between a bent portion of the frame body 110 and an inner side of the side surface part 112 to provide additional support to the front frame 100. The support member 93 may fill an empty space of the hidden space 113 to limit movement of the front frame 100.

The cover member 90 extending to the lower side of the display panel 10 may be arranged such that the middle mold 40 and an inner surface of the cover member 90 are spaced a certain distance d apart from each other to secure a space through which the CoF 11 may pass to extend to the chassis 80.

Alternatively, as illustrated in FIG. 5, the cover member 90 extending to an upper side or left and right sides of the display panel 10 on which the CoF 11 is not arranged may be in contact with the middle mold 40 without separation, and may not include the support part 91 since the front frame 100 is not arranged thereon.

A front surface 90a, which forms a front end of the cover member 90, may be provided at a location corresponding to the front surface of the front frame 100 or the front surface of the first polarizer 15 in forward and backward directions of the display panel 10.

Accordingly, the display panel 10, the front frame 100, and the cover member 90 may be located on the same plane (e.g., flush or level with each other), and thus the display apparatus 1 may have a more pleasing finish in the absence of a bezel, thereby improving the aesthetics of the display apparatus 1.

Although the cover member 90 may include the front surface 90a forming the front end of the cover member 90, as illustrated in FIG. 4, the front surface 90a may be sufficiently thin to escape the notice of a user. However, example embodiments are not limited thereto, and the cover member 90 may have a linear front profile without having the front surface 90a, and thus a front exterior of the cover member 90 may slant from the point where the frame body 110 meets the cover member 90 towards the rear.

The plurality of layers 120 of the front frame 100 will be described below.

As described above, the front frame 100 is on the same plane as the front surface of the display panel 10, and may thus appear to be integrally formed with the display panel 10. When the front frame 100 has a different color from that of the display panel 10, the display panel 10 and the front frame 100 may not appear to be integrally formed even when they are formed on the same plane.

To solve this problem, the plurality of layers 120 may be provided such that the front frame 100 has a color and light reflectivity corresponding to those of the portion of the display panel 10 adjacent to the front frame 100.

Figure 6:
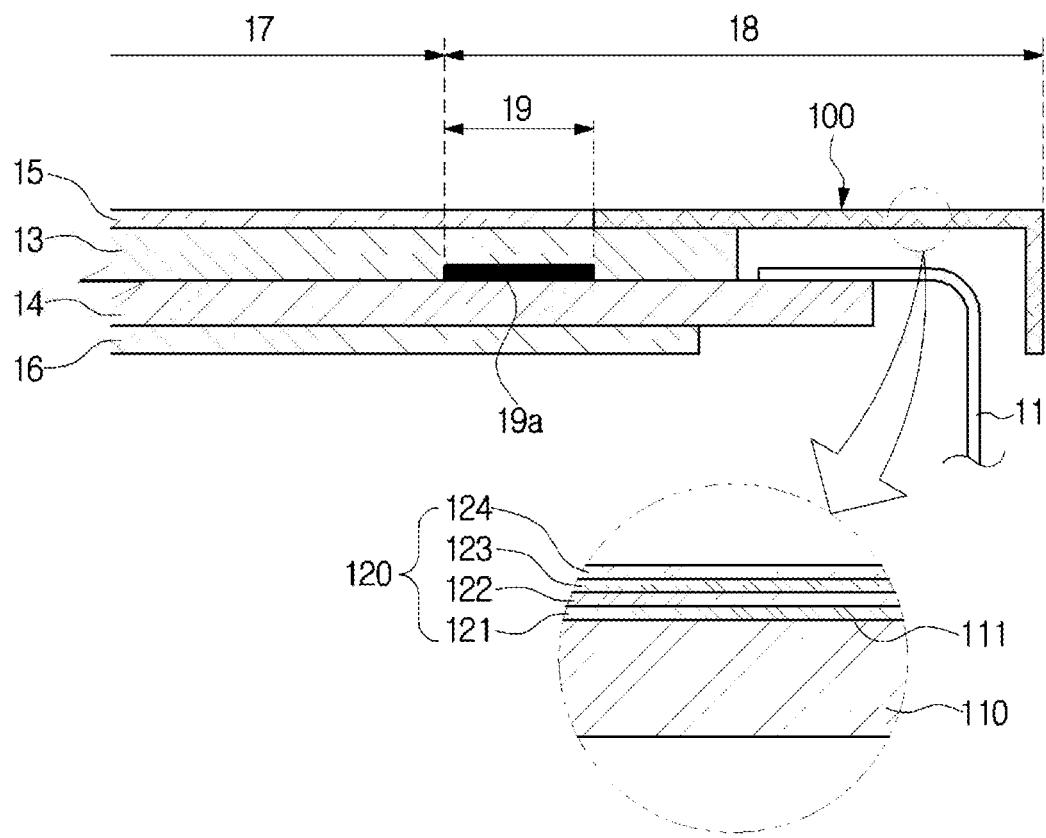
FIG. 6 is a cross-sectional view of a display panel and a front frame of a display apparatus in accordance with an example embodiment.

As illustrated in FIG. 6, the display panel 10 may include a display area 17 for displaying an image and a non-display area 18 located at edges of the display area 17. The display area 17 is a region of the front of the display panel 10 on which an image is displayed. No image is displayed and a color roughly corresponding to black may be featured on the non-display area 18.

The non-display area 18 may include a black matrix region 19. The black matrix region 19 is a region having a black color to block light passing through a liquid crystal layer formed between the first substrate 13 and the second substrate 14, and may be formed by a black matrix 19a printed on the first substrate 13 or the second substrate 14.

Thus, the black matrix region 19 may have a black color corresponding to (e.g., matching) a color of the black matrix 19a.

The non-display area 18 may include regions between the first polarizer 15 and the first substrate 13 and regions between the first substrate 13 and the second substrate 14 as well as the black matrix region 19.

However, a portion of the non-display area 18 is not exposed to the outside by the front frame 100, and only the black matrix region 19 may be exposed to a user. Thus, the display area 17, the black matrix region 19, and the front surface of the front frame 100 may be shown to the user as the front surface of the display apparatus 1.

The front frame 100 is located close to the black matrix region 19. Thus, when the front surface of the front frame 100 has a color different from that of the black matrix region 19, the boundary between the front frame 100 and the display panel 10 may look more pronounced, which may not be as aesthetically pleasing, as described above.

To solve this problem, the plurality of layers 120 may be provided on a front surface of the front surface part 111 such that the front surface of the front frame 100 has the same color as the black matrix region 19.

Even when the front surface of the front frame 100 is simply printed in a color corresponding to or at least similar to the black color of the black matrix 19a, the black matrix 19a is visible to a user through the first substrate 13 and the first polarizer 15. Thus, the color of the black matrix 19a may appear to the user as a different shade of black from its original color thereof.

Thus, the plurality of layers 120 may be provided such that the front surface of the front frame 100 has a color corresponding to the correct shade of the black matrix 19a as observed by a user through the first substrate 13 and the first polarizer 15.

In particular, as the color of the black matrix 19a is seen through the first substrate 13 formed of glass and the first polarizer 15, which may adjust a direction of light, the color of the black matrix 19a visible to the user may have light reflectivity different from that of the black matrix 19a when shown to the user without the first substrate 13 and the first polarizer 15.

Furthermore, as the color of the black matrix 19a is seen through the first substrate 13 and the first polarizer 15, which may adjust the direction of light, the color of the black matrix 19a may be mixed with original colors of the first substrate 13 and the first polarizer 15 and be seen as a color different from the color of the black matrix 19a when shown to the user without the first substrate 13 and the first polarizer 15.

Thus, even when the front surface of the front frame 100 is simply printed in the original color of the black matrix 19a, the black matrix region 19 and the front surface of the front frame 100 may appear to be of different shades of black to the user, thereby accentuating the boundary between the black matrix region 19 and the front frame 100 rather than making them appear to have been integrally formed.

To solve this problem, the plurality of layers 120 may include layers 121, 122, 123, and 124 that simulate the color and light reflectivity of the black matrix 19a, as seen through the first substrate 13 and the first polarizer, so that the black matrix region 19 and the front surface of the front frame 100 may appear to be integrally formed.

In detail, in the plurality of layers 120, a color layer 121 printed in a color corresponding to the original color of the black matrix 19a may be located on the front surface of the front surface part 111.

The color layer 121 may be provided to maintain the color corresponding to the original color of the black matrix 19a. The color layer 121 may be printed in black ink corresponding to the color of the black matrix 19a.

A transparent layer 122 formed of a transparent material may be located in front of the color layer 121. That is, the transparent layer 122 may generate an effect obtained when the color of the black matrix 19a is seen through the first substrate 13 by a user.

The transparent layer 122 may be provided by applying a transparent hard coating material to the black ink printed on the color layer 121.

An iodine layer 123 including an iodine (I) material may be located in front of the transparent layer 122. The iodine layer 123 may have a color corresponding to the original color of the first polarizer 15 to correspond to the first polarizer 15 located in front of the black matrix 19a and the first substrate 13.

That is, the iodine layer 123 located in front of the transparent layer 122 may generate an effect obtained when the color of the black matrix 19a is seen through the first substrate 13 and the first polarizer 15 by a user.

The iodine layer 123 may be provided in front of the transparent layer 122 coated with the transparent hard coating material, and be coated with an iodine material.

An anti-reflective (AR) coating layer 124 processed to decrease light reflectivity may be located in front of the iodine layer 123. A surface of the first polarizer 15 may be AR-coated to decrease the light reflectivity.

Thus, the AR coating layer 124 decreasing the light reflectivity may be located in front of the iodine layer 123 to correspond to the surface of the first polarizer 15 located in front of the black matrix 19a and the first substrate 13.

That is, the AR coating layer 124 located in front of the iodine layer 123 may generate an effect obtained when light reflectivity corresponding to light reflectivity changed by the AR coating layer 124 is recognized by a user while the color of the black matrix 19a is seen through the first substrate 13 and the first polarizer 15.

Thus, light reflected from the front surface of the front frame 100 may have a color and reflectivity corresponding to those of light reflected from the black matrix region 19 as the light passes through the plurality of layers 120. Thus, a user may recognize that the black matrix region 19 and the front frame 100 have a color and reflectivity corresponding to those of light reflected from the black matrix region 19.

Figure 7:
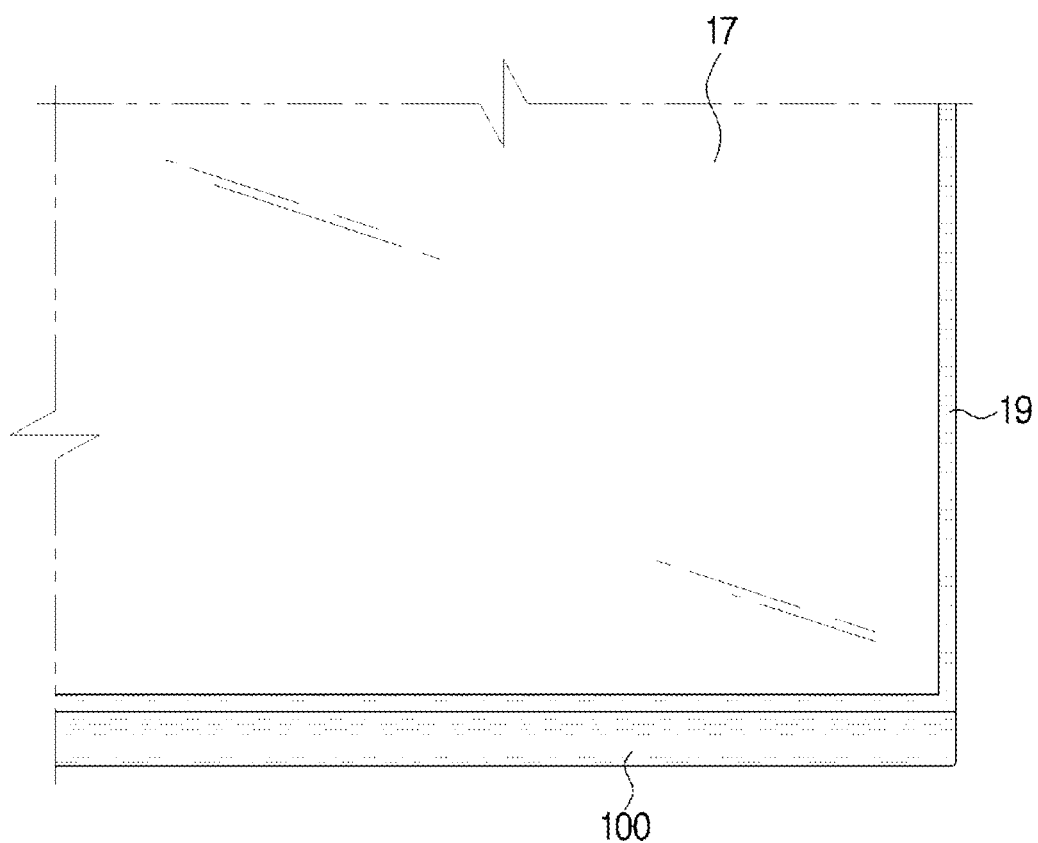
FIG. 7 is a front view of a part of a display apparatus in accordance with an example embodiment.

As illustrated in FIG. 7, the black matrix region 19 and the front frame 100 may appear as though they are integrally formed such that the front frame 100 appears to be part of the display panel 10. Thus, the plurality of layers 120 of the front frame 100 may cause the display apparatus 1 to appear as a bezel-less display apparatus.

According to an aspect of an example embodiment, the plurality of layers 120 may include the four layers 121, 122, 123, and 124, but are not limited thereto, and may include the three layers 121, 122, and 124.

In detail, the color layer 121, transparent layer 122, and the AR coating layer 124 may be sequentially arranged in accordance with an example embodiment of the present disclosure but the iodine layer 123 may not be included between the transparent layer 122 and the AR coating layer 124.

If the iodine layer 123 is not included, the color of the front surface of the front frame 100 may appear to be different from that of the black matrix region 19 because the original color of the first polarizer 15 is mixed with the color of the black matrix 19a while the color of the black matrix 19a is seen through the first polarizer 15.

To solve this problem, the color layer 121 may be printed and painted by adding an iodine material to the original color of the black matrix 19a so that the color layer 121 may have a color obtained by mixing the black color of the black matrix 19a with a color of the iodine material.

However, example embodiments of the present disclosure are not limited thereto, and at least one among the four layers 121, 122, 123, and 124 may not be provided as described above.

When the surface of the front frame 100 has a color which is the same as the original color of the black matrix 19a, the color layer 121 may not be included. When the surface of the front frame 100 has a color obtained by mixing the original color of the black matrix 19a with the color of the iodine material, the color layer 121 and the iodine layer 123 may not be included.

In some cases, the transparent layer 122 may not be provided.

A display apparatus 1 in accordance with another embodiment of the present disclosure will be described below. A structure of the display apparatus 1 is similar to that of the display apparatus 1 in accordance with the example embodiment described above and will not be redundantly described except for a front frame 100, which will be described below.

Figure 8:
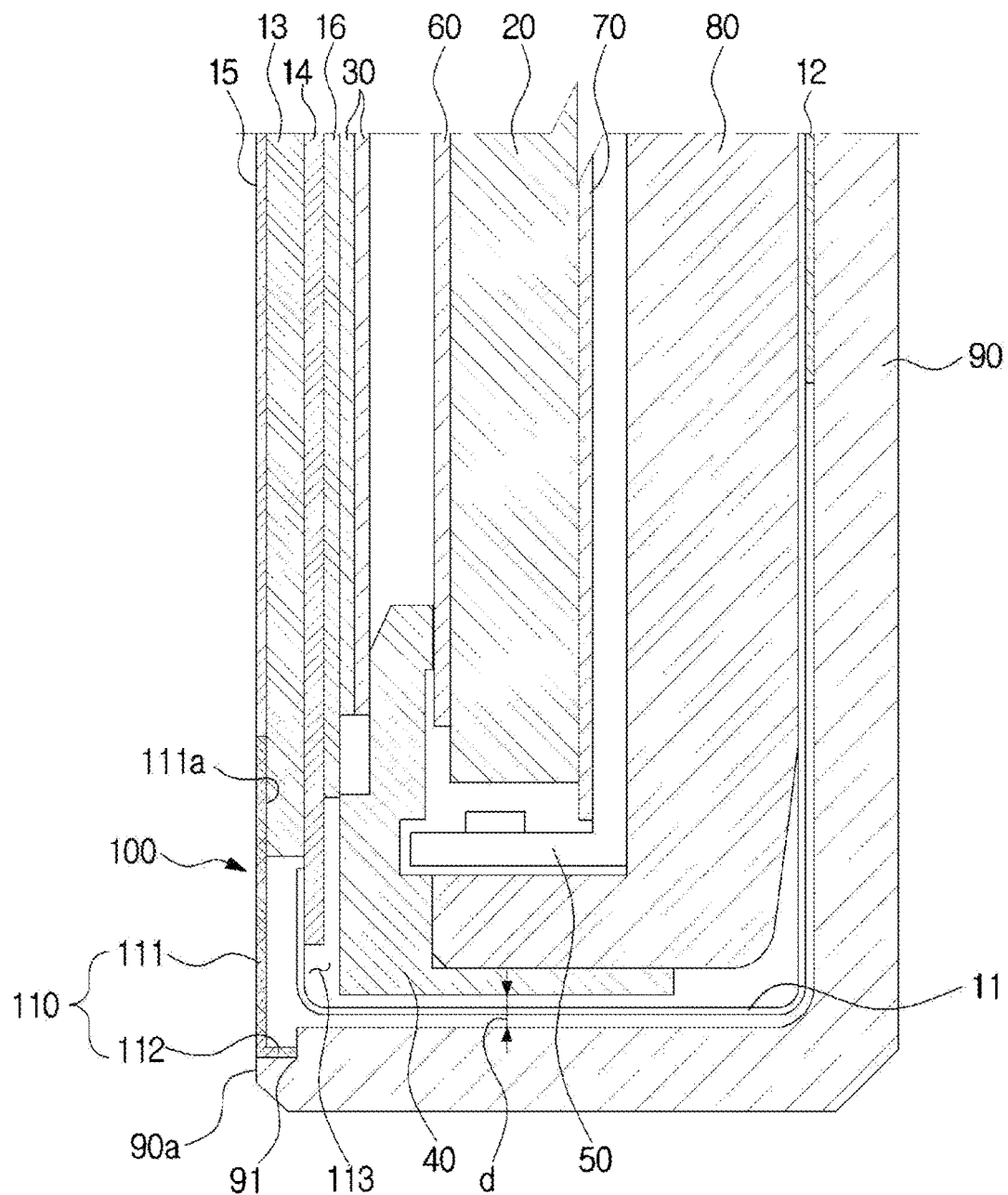
FIG. 8 is a cross-sectional view of a part of a display apparatus in accordance with an example embodiment.

As illustrated in FIG. 8, the display apparatus 1 in accordance with an example embodiment may not include a support member supporting the front frame 100 and located at an inner side of a side surface part 112 and a rear side of a front surface part 111.

As described above, the side surface part 112 of the front frame 100 is supported while not being adhered to the support part 91, and thus the front frame 100 may be moved. To prevent this problem, a liquid material such as an adhesive may be applied into a hidden space 113 to support the front frame 100 by the liquid material filing an empty space of the hidden space 113 instead of the support member. The liquid material may be hardened to support the front frame 100.

Figure 9:
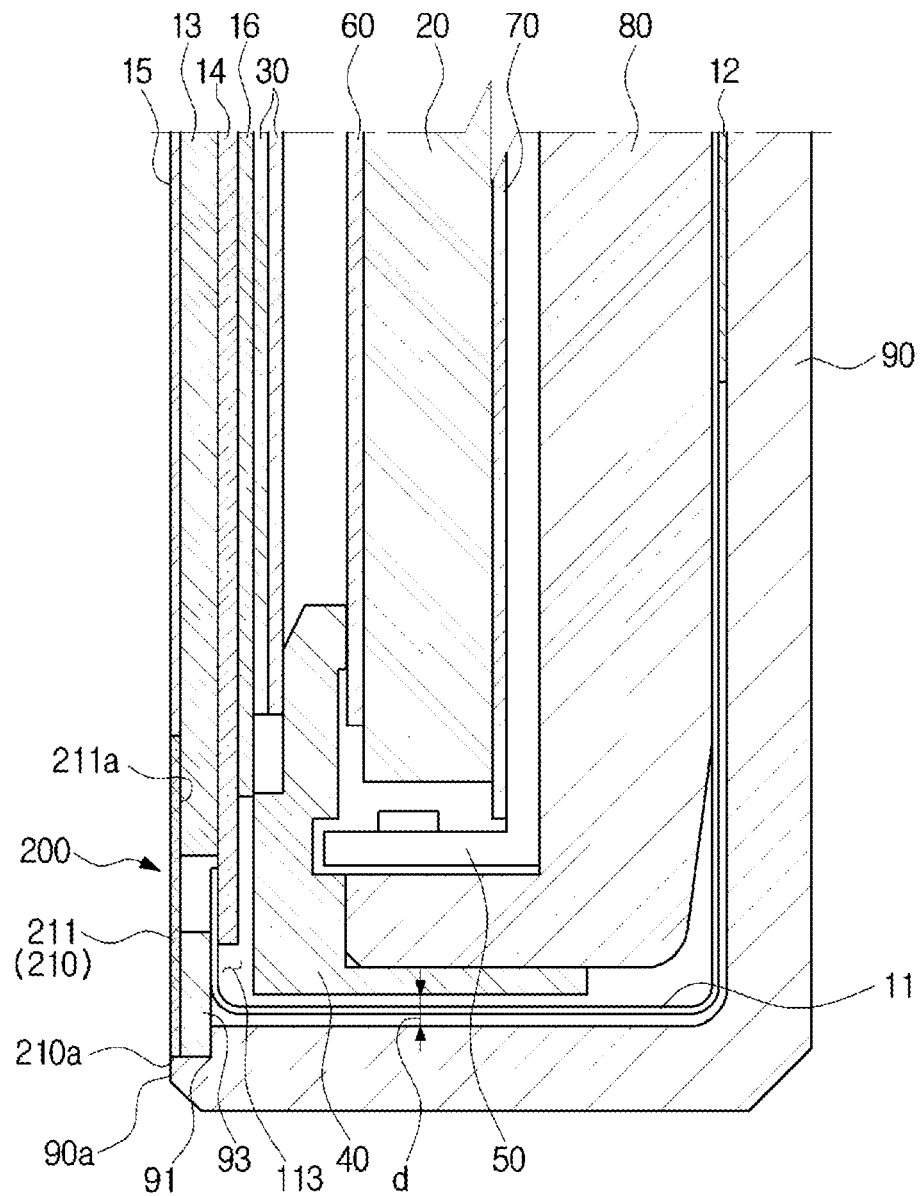
FIG. 9 is a cross-sectional view of a part of a display apparatus in accordance with an example embodiment.

As illustrated in FIG. 9, a front frame 200 may not include a side surface part. That is, a frame body 210 may be formed in a plate shape, which is planar in shape and does not bend into a side surface part.

Thus, the frame body 210 extending from a contact surface 211a to a cover member 90 may extend to a support part 91 to be roughly parallel to a display panel 10 without being bent at a side thereof.

An outer end 210a (e.g., bottom end) of the frame body 210 (or a front surface part 211) may be in contact with the support part 91. A support member 93 may be arranged in a space which may be formed by the support part 91 due to the absence of the side surface part, and thus the front frame 200 may be supported by the support part 91.

Since the frame body 210 has no bent part, the front frame 200 may be easier to manufacture than the front frame 100 having the side surface part 112. When the front frame 100 in accordance with an example embodiment is formed of a soft material, a shape of a bent part of the frame body 110 may not be maintained (e.g., structural integrity may be compromised). However, in the front frame 200 in accordance with another example embodiment of the present disclosure, a shape of the frame body 210 may be easily maintained regardless of the rigidity of the material of the front frame 200.

Alternatively, the support member 93 may not be provided between the front frame 200 and the support part 91. In this case, a liquid material, such as an adhesive, may be applied between the front frame 200 and the support part 91 and then be hardened to support the front frame 200 as described above.

A display apparatus 300 in accordance with an example embodiment will be described below. A structure of the display apparatus 300 is substantially similar to that of the display apparatus 1 in accordance with example embodiments described above and will not be redundantly described except for a display panel 310, a front frame 320, etc.

Figure 10:
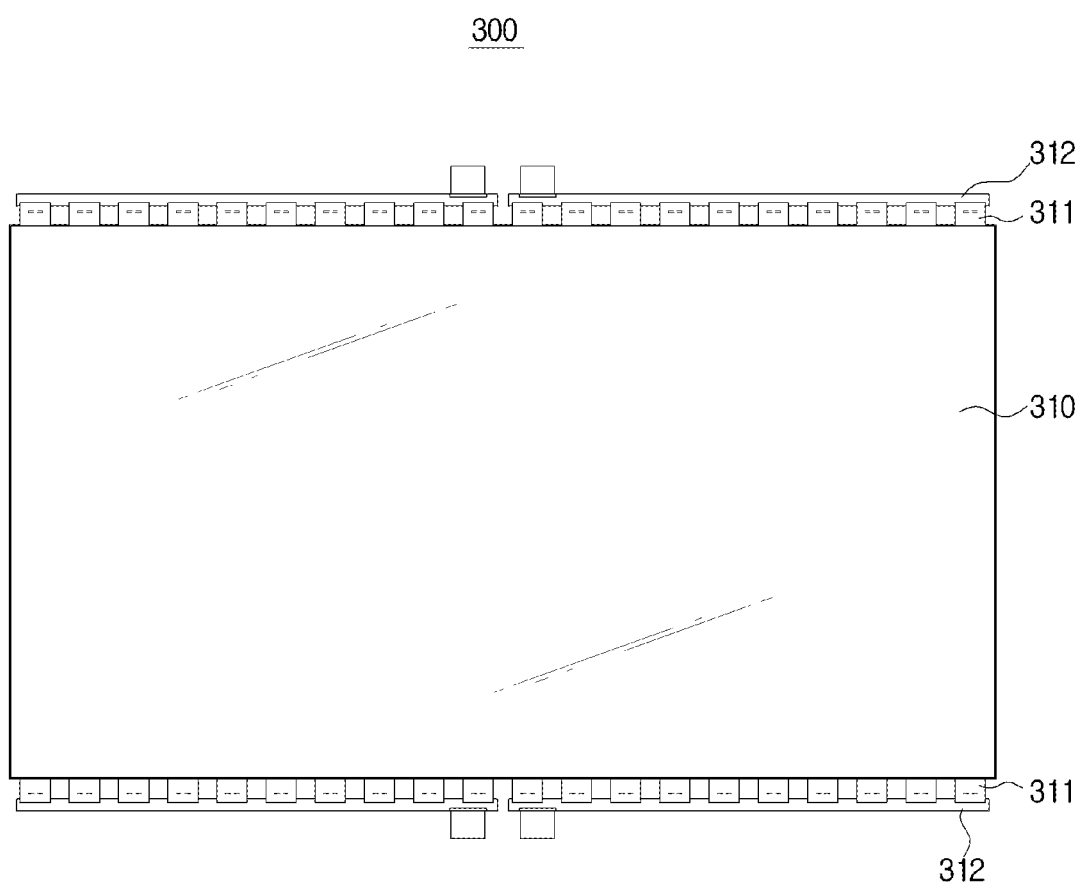
FIG. 10 is a front view of a display panel of a display apparatus in accordance with an example embodiment.
Figure 11:
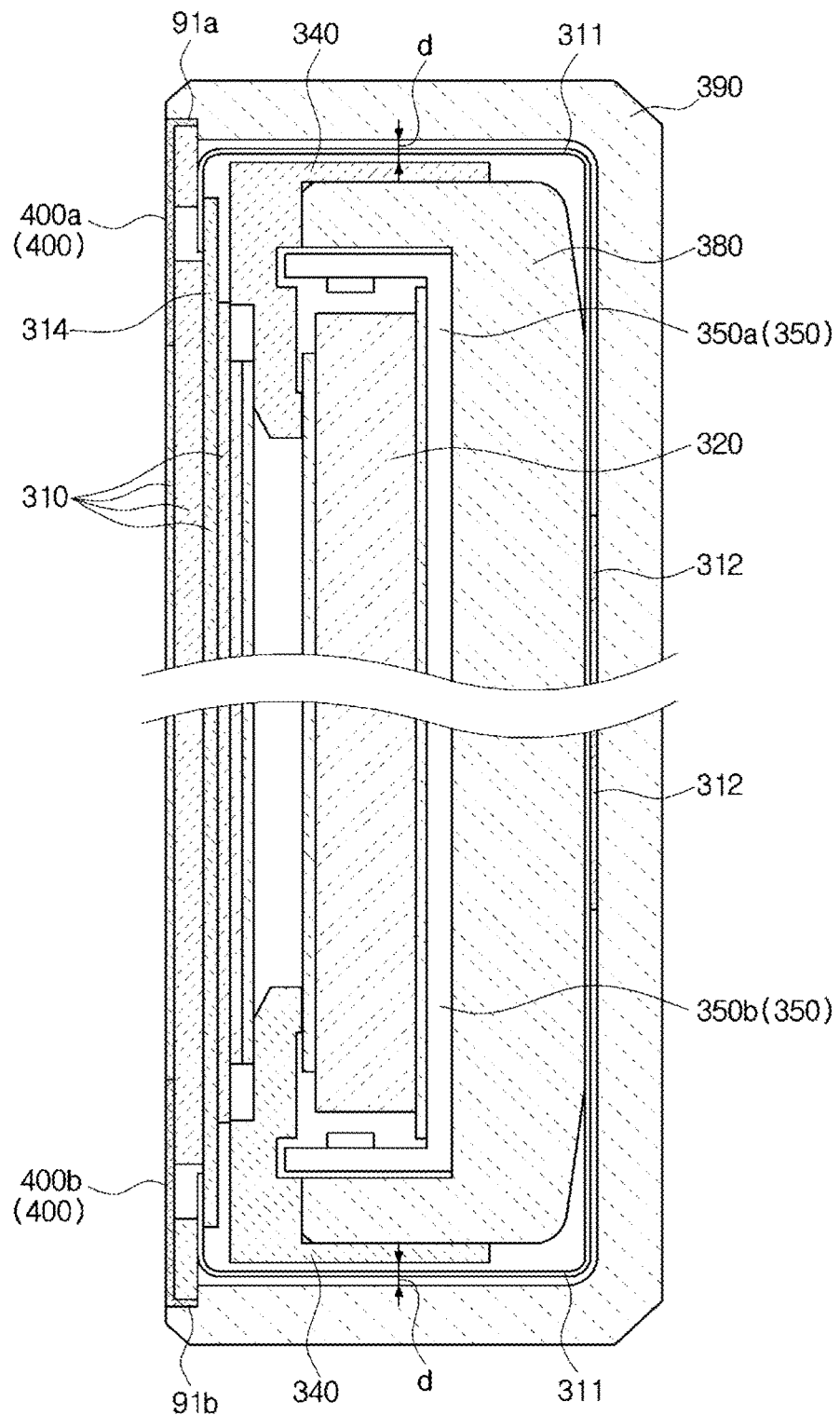
FIG. 11 is a cross-sectional view of a display apparatus in accordance with an example embodiment.

As illustrated in FIGS. 10 and 11, unlike the display apparatus 1 as described above, a pair of CoFs 311 may be coupled to upper and lower surfaces of the display panel 310 of the display apparatus 300. Thus, a step may be formed between components of the display panel 310 at upper and lower sides of the display panel 310, and the CoFs 31 may be coupled to upper and lower sides of a second substrate 314.

Thus, a front frame 400 covering steps formed between the CoFs 311, a PCB 312, and the display panel 310 may be arranged at the lower side of the display panel 310 as in an example embodiment discussed above, and may be additionally arranged on the upper side of the display panel 310.

That is, the front frame 400 may cover at least a side of the display panel 310. When the CoFs 311 are arranged on the upper and lower sides of the display panel 310, two front frames 400 may be formed to cover the upper and lower sides of the display panel 310.

However, example embodiments are not limited thereto, and when the CoFs 311 are arranged on left and right sides of the display panel 310 rather than the upper and lower sides of the display panel 310, front frames 400 may be provided to cover left and right sides of a front surface of the display panel 310.

When the CoFs 311 are arranged on at least three sides of the display panel 310 (e.g., top, left, and right; bottom, left, and right; top, bottom, left; etc.) or when steps are formed between the components of the display panel 310, the front frames 400 may be arranged on at least three side surfaces of the front surface of the display panel 310 to cover the display panel 310. The CoFs 311 may be arranged on four sides of the display panel 310 (e.g., top, bottom, left, and right), and the front frames 400 may be arranged on the four sides of the front surface of the display panel 310.

As illustrated in FIG. 11, since the CoFs 311 are coupled to the upper and lower sides of the display panel 310, the front frame 400 may include a first front frame 400a and a second front frame 400b on the upper side and the lower side of the display panel 310, respectively.

A cover member 390 extending to the upper and lower sides of the display panel 310 may include a first support part 91a and a second support part 91b supporting the first and second front frames 400a and 400b, respectively.

The cover member 390 extending to the upper and lower sides of the display panel 310 and a middle mold 340 may be spaced a distance d apart from each other so that the CoFs 311 extending on the upper and lower sides of the display panel 310 may be bent and extend to a rear surface of a chassis 380.

Light source modules 350a and 350b including light sources for emitting light toward a light guide plate 320 may be respectively arranged on upper and lower side surfaces of the light guide plate 320. However, example embodiments of the present disclosure are not limited thereto, and only one of the light source modules 350a and 350b may be provided on the upper or lower side surface of the light guide plate 320.

Alternatively, a pair of light source modules 350 may be arranged on left and right side surfaces of the light guide plate 320 or the light source module 350 may be selectively provided on the left or right side surface of the light guide plate 320.

As described above, even when the steps (e.g., cascading structures or indents) are formed between the components of the display panel 310 or the CoFs 311, and are arranged on a plurality of side surfaces of the display panel 310, a plurality of front frames 400 may be provided to cover the steps between the components of the display panel 310 or the CoFs 311, thereby preventing the exposure of the steps or the CoFs to the outside.

Even when the plurality of front frames 400 are provided as illustrated in FIG. 11, front surfaces of the plurality of front frames 400 may have a color and light reflectivity corresponding to those of the above-described black matrix region 19. Thus, the plurality of front frames 400 may appear to be integrally formed with the display panel 310.

According to an aspect of an example embodiment, a display apparatus has a structure which does not include a bezel to cover side surfaces of a display panel, and thus the structure of the display apparatus may be simplified and the display apparatus may be more aesthetically pleasing.

The present disclosure is not limited to the example embodiments set forth herein, and it would be apparent to those skilled in the art that various changes and modifications may be made without departing from the idea of the present disclosure. Thus, it should be understood that all changes and modifications are included in the technical scope of the present disclosure as claimed in the claims of the present disclosure.

What is claimed is:

1. A display apparatus comprising:
   a display panel including a display area configured to display an image in a forward direction and a non-display area provided at edges of the display area; and
   a front frame configured to cover a side of a front surface of the display panel;
   wherein the front frame comprises a frame body and a plurality of layers arranged on a front surface of the frame body, the front frame having a first color corresponding to a second color of the non-display area.

2. The display apparatus according to claim 1, wherein the non-display area comprises a black matrix region, and
wherein the plurality of layers comprise a first layer having a third color corresponding to a fourth color of the black matrix region.

3. The display apparatus according to claim 2, wherein the plurality of layers further comprise a second layer disposed in front of the first layer and configured to decrease first light reflectivity of a front surface of the front frame such that the first light reflectivity of the front frame corresponds to second light reflectivity of the non-display area.

4. The display apparatus according to claim 3, wherein the plurality of layers further comprise a third layer disposed between the first layer and the second layer, the third layer comprising a transparent material.

5. The display apparatus according to claim 4, wherein the plurality of layers further comprise a fourth layer disposed between the second layer and the third layer, the fourth layer comprising an iodine (I) material.

6. The display apparatus according to claim 4, wherein the first layer comprises an iodine (I) material.

7. The display apparatus according to claim 1, wherein the display panel further comprises a polarizer, a first substrate disposed behind the polarizer, and a second substrate disposed behind the first substrate,
wherein a front surface of the front frame is level with a fourth front surface of the polarizer.

8. The display apparatus according to claim 7, wherein the front frame is in contact with the first substrate.

9. The display apparatus according to claim 1, further comprising:
a printed circuit board configured to transmit an electrical signal to the display panel; and
a chip-on-film configured to couple the printed circuit board to the display panel,
wherein the chip-on-film is disposed behind the front frame.

10. The display apparatus according to claim 9, further comprising:
a middle mold configured to support the display panel; and
a chassis configured to be coupled to a rear side of the middle mold,
wherein the chip-on-film is bent behind the front frame toward a rear surface of the chassis.

11. The display apparatus according to claim 1, further comprising a cover configured to cover a side surface of the display panel and a side surface of the front frame.

12. The display apparatus according to claim 11, wherein a front surface of the cover is level with a front surface of the front frame.

13. A display apparatus comprising:
a display panel divided into a display area configured to display an image in a forward direction and a non-display area provided at edges of the display area, the display panel comprising a polarizer, a first substrate disposed behind the polarizer, and a second substrate disposed behind the first substrate; and
a front frame configured to cover at least a portion of a front surface of the display panel, the front frame having a first color corresponding to a second color of the non-display area,
wherein a front surface of the front frame is disposed on a level plane as a front surface of the polarizer.

14. The display apparatus according to claim 13, wherein the non-display area comprises a black matrix region, and
wherein the front frame comprises a first layer having a third color corresponding to a fourth color of the black matrix region.

15. The display apparatus according to claim 14, wherein the front frame further comprises:
a second layer disposed in front of the first layer, the second layer having a fifth color corresponding to a sixth color of the first substrate; and
a third layer disposed in front of the second layer, the third layer having a first material corresponding to a second material of the polarizer, wherein the front frame has first light reflectivity corresponding to second light reflectivity of the non-display area.

16. The display apparatus according to claim 15, wherein the front frame further comprises a fourth layer disposed between the second layer and the third layer, the fourth layer having a seventh color corresponding to an eighth color of the polarizer.

17. The display apparatus according to claim 13, wherein the front frame is in contact with the first substrate.

18. The display apparatus according to claim 13, further comprises:
a printed circuit board configured to transmit an electrical signal to the display panel; and
a chip-on-film configured to connect the printed circuit board to the display panel,
wherein the chip-on-film is disposed behind the front frame to be hidden from a view from an outside of the display apparatus.

19. A display apparatus comprising:
a display panel divided into a display area configured to display an image in a forward direction and a non-display area provided at edges of the display area;
a printed circuit board;
a chip-on-film connecting the printed circuit board to the display panel;
a front frame configured to cover the chip-on-film, and disposed at a side of a front surface of the display panel; and
a cover configured to cover a side surface of the display panel and a side surface of the front frame, and arranged not to cover the non-display area.

20. The display apparatus according to claim 19, wherein the front frame has a first color and first light reflectivity respectively corresponding to a second color and second light reflectivity of the non-display area.

* * * * *